C. B. HOWE.
ROTARY INTERNAL COMBUSTION ENGINE.
APPLICATION FILED MAY 5, 1916.

1,276,765.

Patented Aug. 27, 1918.
4 SHEETS—SHEET 1.

INVENTOR
CLARENCE B. HOWE

BY
Thomas T. Wilder
ATTORNEY

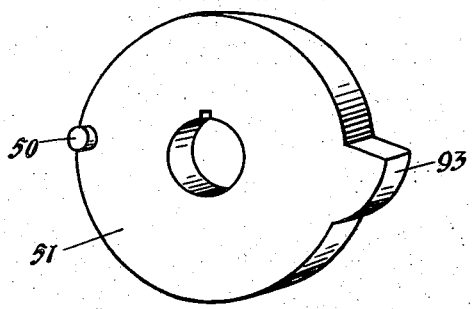
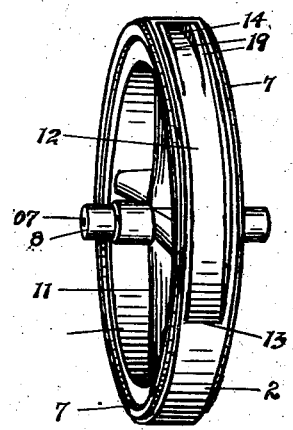
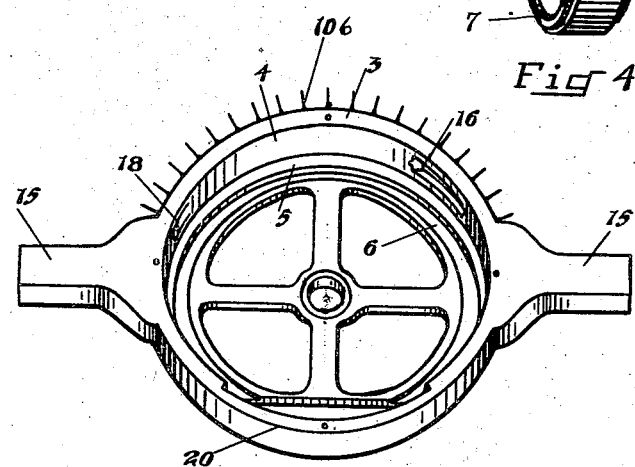
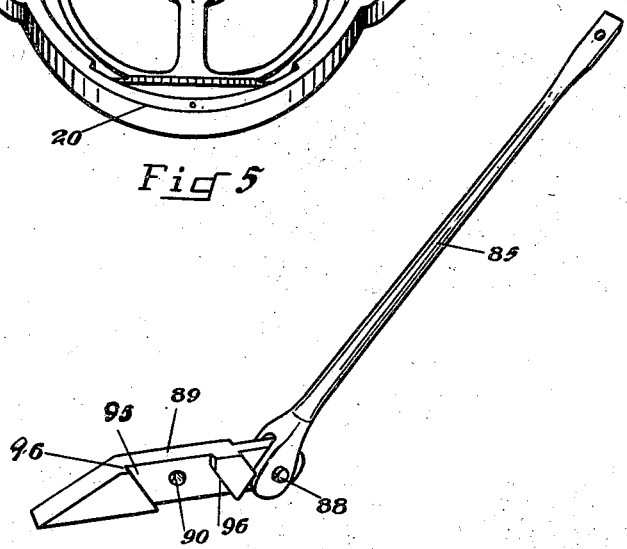

C. B. HOWE.
ROTARY INTERNAL COMBUSTION ENGINE.
APPLICATION FILED MAY 5, 1916.

1,276,765.

Patented Aug. 27, 1918.
4 SHEETS—SHEET 3.

INVENTOR
CLARENCE B. HOWE

BY
*Thomas L. Wily*
ATTORNEY

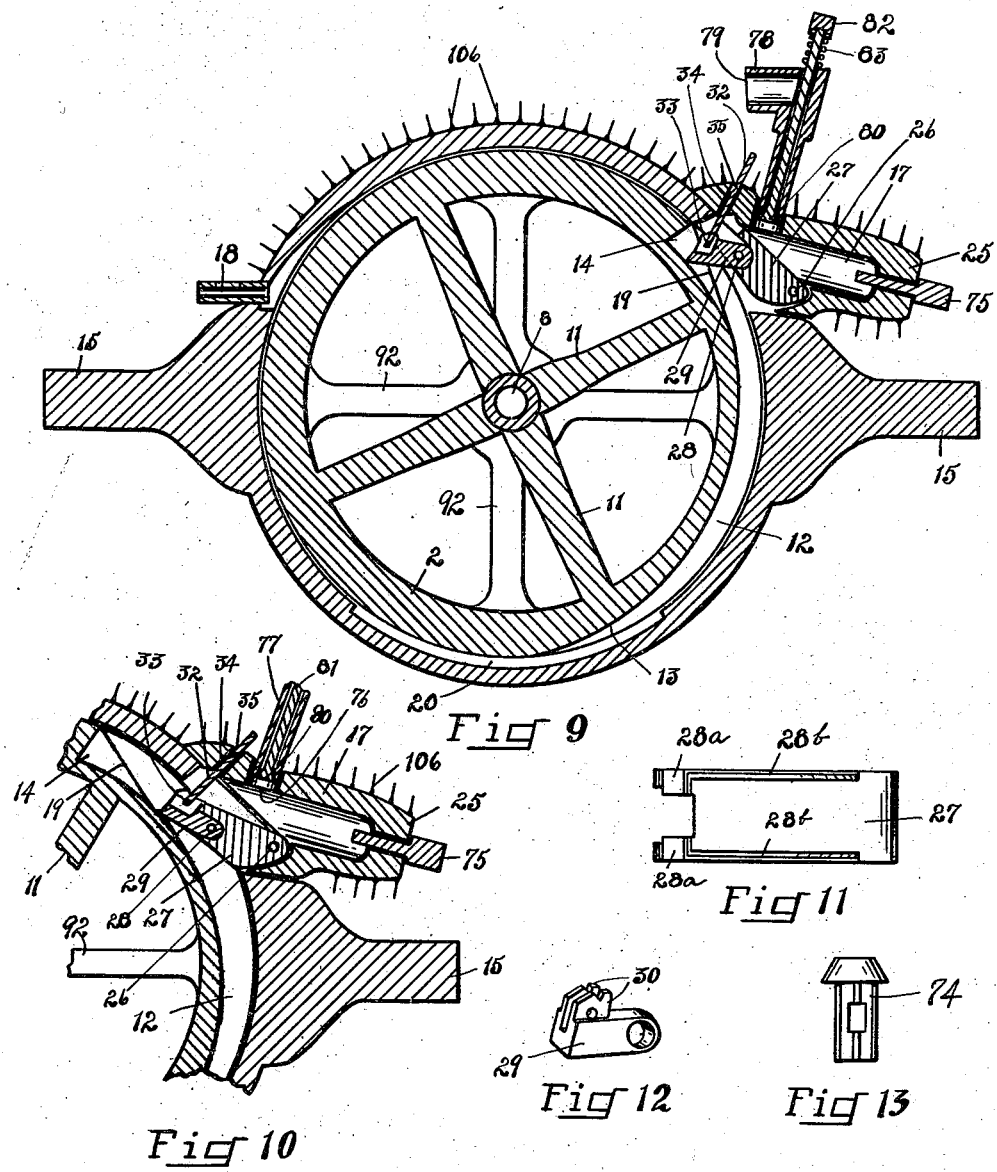

UNITED STATES PATENT OFFICE.

CLARENCE B. HOWE, OF MORRISVILLE, NEW YORK.

ROTARY INTERNAL-COMBUSTION ENGINE.

1,276,765.

Specification of Letters Patent.   Patented Aug. 27, 1918.

Application filed May 5, 1916.   Serial No. 95,672.

*To all whom it may concern:*

Be it known that I, CLARENCE B. HOWE, a citizen of the United States, residing at Morrisville, in the county of Madison and State of New York, have invented certain new and useful Improvements in Rotary Internal-Combustion Engines, of which the following is a specification, reference being had therein to the accompanying drawing.

My invention relates to a rotary internal combustion engine and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a simple, efficient engine that is compact and light in construction, which will produce a greater amount of power with the same fuel than has heretofore been developed in an internal combustion engine.

The engine employs rotors having elongated peripheral recesses or pockets. The rotors are incased so as to prevent any leakage of the expanding gases designed to enter the said recesses or pockets.

Furthermore, the engine employs a novel method of lubricating its parts, which method embodies a recess or well adapted to contain oil and through which well the periphery of the rotor passes.

Certain parts of the engine are provided with ribs forming channels designed to create currents of air adapted to cool the working parts of the engine.

The object will be understood by referring to the drawings in which:

Fig. 3 is a perspective detail view enlarged of a ring employed;

Fig. 4 is a perspective detail view of a rotor used;

Fig. 5 is a perspective detail view of a casing employed to contain said rotor;

Fig. 6 is a perspective detail view of a lever and pawl employed, the same being enlarged;

Fig. 9 is a central vertical section of one of the rotors taken on the line 9—9 of Fig. 2;

Fig. 10 is a vertical section of a fragment of the view shown in Fig. 9, intended to illustrate the range of movement of said valves employed;

Fig. 11 is an enlarged plan view of a valve employed;

Fig. 12 is an enlarged perspective view of an auxiliary valve employed;

Fig. 13 is an enlarged plan view of a one way valve employed.

Figure 1:
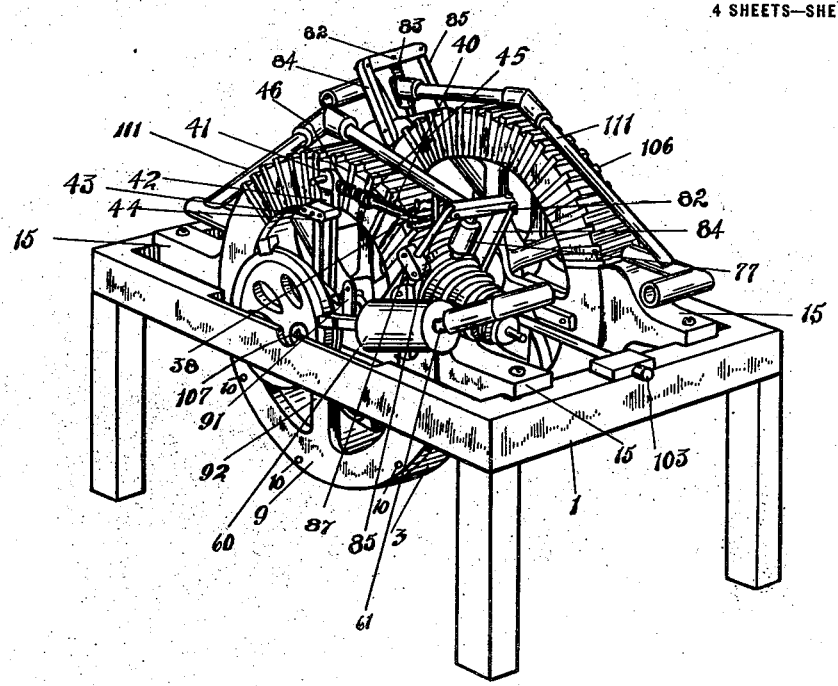
Figure 1 is a perspective view of the engine.

Referring more particularly to the drawings, a suitable frame, as 1, is here employed for mounting the engine, although the same may be mounted directly to the chassis of an automobile or other conveyance or even to a base for use as a stationary engine. The frame supports the rotors 2, there being two in this instance, although any number may be employed. As the rotors 2 are constructed alike, the description of one thereof will be found sufficient for comprehending the nature of the invention.

The rotor 2 has a stationary casing 3 which comprises the peripheral wall 4 and the side wall 5, the two being cast preferably in one piece. The side wall 5 has an annular recess 6 for housing the annular flange 7 of the rotor 2. The rotor 2 has a flange 7 on each side thereof to fit into corresponding recesses in the wall 5 and the plate 9 respectively. The plate 9 is attached to the casing 3 by the bolts 10. The flanges 7—7 and their corresponding recess 6—6 are adapted to form a closed chamber for the parts of the rotors 2 adjacent the periphery.

The rotor 2 is provided with the spokes 11, the axle or trunnion 8 and an elongated peripheral recess 12 which tapers at 13 from the outer surface of the rotor 2 to a given depth into the felly thereof and terminates at the opposite end in a pocket 14, adjacent which are the shoulders 19—19 inclining toward the bottom of the recess 12.

The outer stationary casing 3 of the rotor 2 has the brackets 15—15 for mounting said casing 3 to the frame —1—. The casing 3 has also a recess 16 covered by an explosion chamber 17 of the casing 25 and a recess 18 located nearly opposite for the escape of the exhaust. At the lower portion of the casing 3, there is formed a recess 20 adapted to contain oil in which the parts of the rotor 2 will travel in order to keep the same well lubricated.

The explosion chamber 17 disposed over the recess 16 of the casing 3 has a semi-spherical end wall to aid in concentrating the exploded gases and is formed within the casing 25. To the casing 25, there is pivotally mounted at 26 a valve 27 pivotally supporting at 28, in turn, an auxiliary valve 29 which has the shoulders 30—30 adapted to fit against the shoulders 31—31 of the valve 27, when the chamber 17 is closed by the valve 27. The valve 27 has a triangular shaped shoulder 28$^a$ and the triangular shaped recesses 28$^b$ adapted to fit into the complementary parts formed in the casing 25 of the chamber 17, whereby to effect an air tight joint of the said valves 27 and 29 with the casing 25, when the same are in closed position. The inner surface of the valve 27 is concaved.

The actuation of the auxiliary valve 29 upon its fulcrum 28 is controlled by a stem 32 pivoted to the auxiliary valve 29 at 33 and extending upward through a suitable aperture 34 in the casing 25. The stem 32 is provided with a notch 35 intended to be engaged, at the proper time, by a pawl 36 fulcrumed to the casing 25 at 37. The end of the pawl 36 opposite the tooth engaging part is bifurcated at 38 for the reception of the end of a tappet 40, which is secured in place by a pivot. The opposite end of the tappet 40 is pivoted to the bifurcated end 41 of the lever 42 that is fulcrumed to the shaft 43 having a bearing in the bracket 44 fixed to the plate 9. The tappet 40 projects through a collar 45 attached to the plate 9. A coiled spring 46 is disposed about the tappet 40 and bears at one end against the collar 45 and at the other against the bifurcated end 41 of the lever 42, whereby to urge normally the upper end of the lever 42 away from the collar 45 and in turn hold the pawl 36 in given position to engage the notch 35 of the stem 32.

The lever 42 is rocked upon its pivot 43 intermittingly by a tooth 50 projecting laterally from the ring 51 keyed to the trunnion 8 of the rotor 2, so as to revolve therewith.

The mixture of vaporized oil and air or fuel from the carbureter is admitted to the chamber of the cylinder 60 through the one way valve disposed in the tube 61 and is compressed by the piston head 62 which is reciprocated in the cylinder 60. The mechanism for reciprocating the piston head 62 embodies an arm 63 pivoted at 64 to the bifurcated end of the piston rod 65. The opposite end of the arm 63 is rigidly attached to the eccentric strap 66 whose ends are provided with the offset members 67 held together by a bolt 68. The inner surface of the eccentric strap 66 is recessed for the reception of the contiguous edge of the eccentric 70, whereby to hold said strap 66 thereon. The eccentric 70 is keyed to turn with the trunnion 8 of the rotor 2.

The cylinder 60 has a plate 71 which is formed integral therewith and attached to the plate 9 of the casing 3, whereby to hold the cylinder 60 in assembled position. Furthermore, the cylinder 60 is provided with a port 72 connected to the chamber 17 of the casing 25 by a pipe or conduit 73 provided with a one way valve 74 opening into said explosion chamber 17, in order to admit the compressed charge or mixture of vaporized oil and air into said chamber 17 and prevent the same from returning upon its course.

The charge is exploded by an electric spark from the plug 75 disposed in the end of the casing 25. Immediately after the explosion has spent its force, the residue of the gases in chamber 17 is permitted to escape by way of the port 76 connected to the conduit 77 having an elbow at 78 and an opening at 79 which is connected to the exhaust port 18 by a conduit 111. The opening of the port 76 is controlled by a one way valve 80 possessing a stem 81 which extends up through the conduit 77 and an aperture in the elbow 78. The upper end of the stem 81 is pivotally attached to the arm 82, which is recessed to receive the upper end of said stem 81, and is surrounded by the coiled spring 83 that bears at one end against the surface of the casing 25 and at the other against the arm 82, whereby to hold the arm 82 in elevated position, so as to close normally the one way valve 80.

The arm 82 is pivotally connected at 83$^a$ to the bifurcated upper end of the bracket 84 attached to the casing 25, and is rocked downward upon its pivot 83$^a$, whereby to open the one way valve 80, at the proper moment, by the lever 85 pivoted at 86 to the bifurcated end of the arm 82. The lever 85 passes through a guide sleeve 87, mounted on the plate 9, and is U-shaped at its opposite end, whereby to be pivotally joined at 88 to the dog or pawl 89. The pawl 89 is fulcrumed at 90 to the bracket 91 formed integral with one of the radial arms 92 of the plate 9. The free end of the pawl 89 is adapted to ride upon the peripheral surface of the ring 51 which has formed upon one section thereof a cam 93 intended to engage the free end of the pawl 89, once every revolution, whereby to rock the said pawl 89 upon its fulcrum 90 and thereby cause a resultant movement upon the lever 85, arm 82 and valve stem 81 to open the valve 80 at the proper instant. The pawl 89 has a lateral recess 95 whose sides 96—96 abut against the bracket 91 to limit the degree of rotation of said pawl 89 upon its pivot 90.

The transmission of power of the rotors 2 to the driving shaft 103 of the engine is effected by mounting a bevel gear 100 to rotate with the trunnion 8 of the rotor 2 on the one side and a bevel gear 101 to rotate with the trunnion 8 of the rotor 2 on the other. The bevel gears 100 and 101 mesh with the common bevel gear 102 mounted to turn with the driving shaft 103, which has bearings at 104 and 105 in the frame —1—.

The casings 3 and 25 are kept cool by means of a plurality of ribs 106 extending from their surfaces, whereby to form air channels therebetween, for the induction of air currents.

The operation of the engine is effected in the manner following: The rotor 2 is started manually by applying a crank handle with an angled end into the angled recess 107 in the trunnion 8 of the near rotor 2. As the rotor 2 is turned, the eccentric 70 will revolve and thereby draw, through its connections, the piston head 62 toward the open end of the cylinder 60, whereby to cause a suction therein, which suction will draw within the cylinder 60 through the one way valve 74 located in the tube 61 a charge of fuel or vaporized oil and air from the carbureter. Upon the return of the piston head 62, the charge aforesaid will be compressed and forced by way of the port 72 and pipe 73 containing a one way valve 74 into the explosion chamber 17 of the casing 25. Here the charge is ignited by a spark from the plug 75. Just at this instant, the pawl 36 is rocked upon its fulcrum 37 by the tappet 40 and lever 42 which is turned upon its pivot 43 by the tooth 50, so as to release the stem 32 to permit the auxiliary valve 29 to lower, which will be effected by the expansion of the gases within the chamber 17. Under the influence of this expansion, the free end of the auxiliary valve 29 will swing down upon its fulcrum 28 into the pocket 14 formed between the shoulders 19—19, whereby to make contact, without pressure, with the bottom surface of the recess 12, and thus not only direct the pressure of the expanding gases toward the pocket 14 of the recess 12, but also to prevent the expansion of the gases in the wrong direction or away from the pocket 14.

Immediately the auxiliary valve 29 has lowered and the rotor 2 begun to revolve, the valve 27 will ride down the shoulders 19—19 under this same influence of the expanding gases in order to open the chamber 17 to full extent to allow the entire force of the expanding gases to effect a rotation of the rotor 2. The portion of the elongated recess 12, into which the gases expand, namely the portion between the end of the pocket 14 and the free end of the auxiliary valve 29 will continue to increase in size, under said expansion, because of the length of the said recess 12, until the exhaust port 18 is reached, at which location in the revolution of the rotor 2, the exhaust escapes and the auxiliary valve 29 and valve 27 are automatically closed by the incline of the plane of the recess 12 to the peripherally outer surface of the rotor 2, and thus prepare the chamber 17 for another charge from the cylinder 60.

The valves 27 and 29 will be locked in closed position by the pawl 36 which is urged normally to engage the tooth 35 of the stem 32 by the coiled spring 46.

The residue of the charge in the chamber 17 of the casing 25 will be allowed to escape, just as the valves 27 and 29 close by way of the port 76 of the conduit 77 having a one way valve 80, which is opened automatically at this instant, by the train of intermediate parts connecting said valve 80 with the pawl 89 actuated by the cam 93. The burned gases remaining in the chamber 17 are under a slight pressure and their escape, as the valves 27 and 29 close, is due to this pressure and to the closing of the valves.

Although I have shown but one pair of rotors 2, which revolve in opposite directions, whereby the motion thereof will be transmitted through their respective bevel gears 100 and 101 to the bevel gear 102 of the common driving shaft 103, a plurality of pairs arranged similarly with relation to the driving shaft 103 may be harnessed thereto, in accordance with the amount of power desired.

Furthermore, each pair of rotors 2 may be controlled, whereby to be thrown in or out of action with respect to the driving shaft 103, so as to effect an economy of power in accordance with the load carried.

Figure 2:
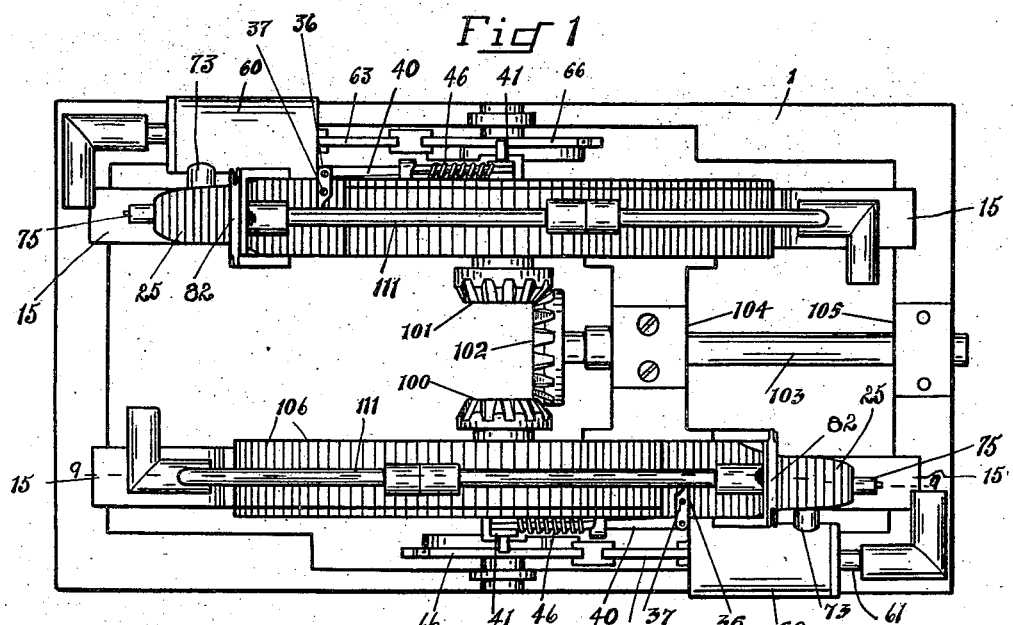
Fig. 2 is a plan view of the engine, looking down from above.
Figure 7:
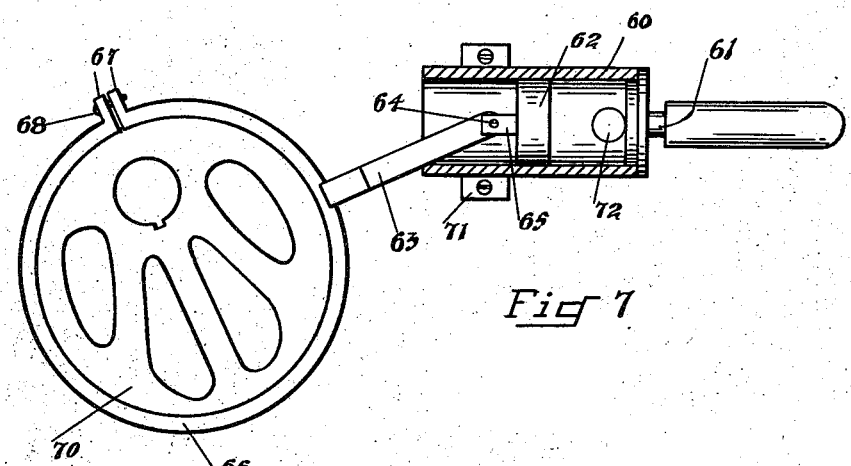
Fig. 7 is a detail enlarged view, showing parts in section of a cylinder and parts immediately connected thereto, employed.
Figure 8:
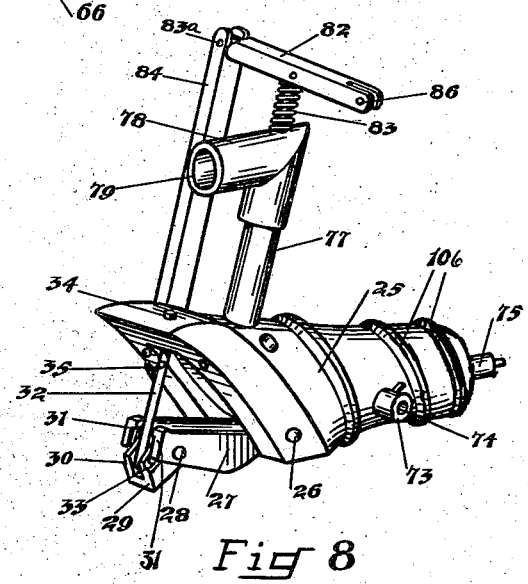
Fig. 8 is a detail perspective view enlarged of the casing of the explosion chamber, showing parts connected thereto.

The ribs 106 are shown exaggerated in Figs. 1 and 8. However, they will be cast with the casings 3 and 25, as a part thereof, to form very thin ribs which will taper from a point adjacent their connections with the casings 3 and 25, where thickest, to a point on their extremities. In Fig. 2 the ribs 106 are not shown as extending down the sides of the casing 3 and plate 9, as in Fig. 1. The omission is intentional in order that parts of the engine therebeneath might be the better seen.

There may be a valve connecting with the well 20, for the admission of oil thereto.

Having thus described my invention what I claim as new and desire to secure by Letters Patent is:

1. In an internal combustion engine, a rotor having an elongated recess, a casing disposed about said rotor, a second casing having an explosion chamber attached to said first named casing, valves in said second named casing, whereby to permit the escape of the expanding gases to revolve said rotor, and a stem having a notch therein for automatically locking said valves in closed position.

2. In an internal combustion engine, a rotor having an elongated recess therein, a pocket formed at the end of said elongated recess, a casing adapted to contain said rotor, a second casing having an explosion chamber, a valve controlling the opening from said explosion chamber to the recess in said rotor, and an auxiliary valve mounted on said first named valve.

3. In an internal combustion engine, a rotor having an elongated recess therein, a casing adapted to contain said rotor, a second casing having an explosion chamber, a valve controlling the opening from said explosion chamber to the recess in said rotor, an auxiliary valve mounted on said first named valve, and means for allowing said auxiliary valve to open before said first named valve.

4. In an internal combustion engine, a rotor having an elongated recess therein, a casing having an explosion chamber, a valve controlling the opening from said explosion chamber to the recess in said rotor, an auxiliary valve mounted on said first named valve, and shoulders formed in said rotor, whereby to prevent the first named valve from opening until after the auxiliary valve has opened.

5. In an internal combustion engine, a rotor having an elongated recess, a casing inclosing said rotor, a second casing having an explosion chamber, a valve controlling the opening of said explosion chamber to the elongated recess, an auxiliary valve pivotedly mounted on said first named valve, a stem having a notch, fulcrumed to said auxiliary valve, and means for engaging the notch in said stem, whereby to lock said valves in closed position.

6. In an internal combustion engine, a rotor, having an elongated recess, a casing inclosing said rotor, an explosion chamber, a valve controlling the opening of said explosion chamber to the elongated recess in said rotor, an auxiliary valve pivotedly mounted on said first named valve, a stem having a notch, fulcrumed to said auxiliary valve, a pawl for engaging the notch in said stem, whereby to lock said valves in closed position, and means for actuating said pawl, whereby to unlock said valves.

7. In an internal combustion engine, a rotor having an elongated recess, an explosion chamber, a valve controlling the opening of said explosion chamber, an auxiliary valve pivotedly mounted on said first named valve, a stem having a notch, whereby to lock said valves in closed position, automatic means for controlling the admission of a charge of vaporized oil and air into said chamber, and a port for allowing the residue of the burnt charge to escape from said chamber.

In testimony whereof I have affixed my signature.

CLARENCE B. HOWE.